(12) United States Patent
Stummer

(10) Patent No.: US 8,688,260 B2
(45) Date of Patent: Apr. 1, 2014

(54) CONFIGURATION OF MACHINE PROCESSES

(75) Inventor: Heinz Stummer, Voecklabruck (AT)

(73) Assignee: Keba AG, Linz (AT)

( * ) Notice: Subject to any disclaimer, the term of this patent is extended or adjusted under 35 U.S.C. 154(b) by 443 days.

(21) Appl. No.: 12/735,593

(22) PCT Filed: Feb. 19, 2009

(86) PCT No.: PCT/AT2009/000061
§ 371 (c)(1),
(2), (4) Date: Jul. 30, 2010

(87) PCT Pub. No.: WO2009/105797
PCT Pub. Date: Sep. 3, 2009

(65) Prior Publication Data
US 2010/0332017 A1    Dec. 30, 2010

(30) Foreign Application Priority Data

Feb. 26, 2008   (AT) ................................ GM116/2008

(51) Int. Cl.
*G05B 11/01*   (2006.01)
*B29C 45/00*   (2006.01)

(52) U.S. Cl.
USPC ............... 700/200; 700/17; 700/87; 715/967; 715/763; 716/139

(58) Field of Classification Search
CPC .................. B29C 45/76; B29C 45/762; B29C 2945/76083; G05B 2219/45244; G05B 2219/13145; G05B 2219/13147; G05B 2219/13148
USPC ........................ 700/17, 200, 87; 715/763, 967
See application file for complete search history.

(56) References Cited

U.S. PATENT DOCUMENTS 4,701,752 A * 10/1987 Wang ............................. 345/655
4,956,566 A *  9/1990 Rupp ............................. 327/360

(Continued)

FOREIGN PATENT DOCUMENTS

DE         41 10 602       10/1991
DE        100 38 441       10/2002

(Continued)

OTHER PUBLICATIONS

ETH, "Case 3.1, SFC with SIMATIC S7-graph", Oct. 23, 2008, pp. 13.*

(Continued)

*Primary Examiner* — Ryan Jarrett
*Assistant Examiner* — Olvin Lopez Alvarez
(74) *Attorney, Agent, or Firm* — Collard & Roe, P.C.

(57) ABSTRACT

A method enables a user to create, edit, monitor and/or optimize the overall machine process of a programmable machine or system assisted by a graphics editor. The programmable machine or system is initially put together as a system of individual machine units which are involved in the overall machine process during certain times by running a number of partial machine processes that are firstly synchronized with one another once they have been set up and then parameters are set for them. These method steps take place in a two-dimensional process diagram created by the graphics editor that plots all the partial machine processes involved in the overall machine process via assigned process symbols that are positioned or repositioned by the graphics editor so that they are arranged in a machine component dimension and in a time dimension.

21 Claims, 3 Drawing Sheets

(56) References Cited

U.S. PATENT DOCUMENTS

Figure 1:
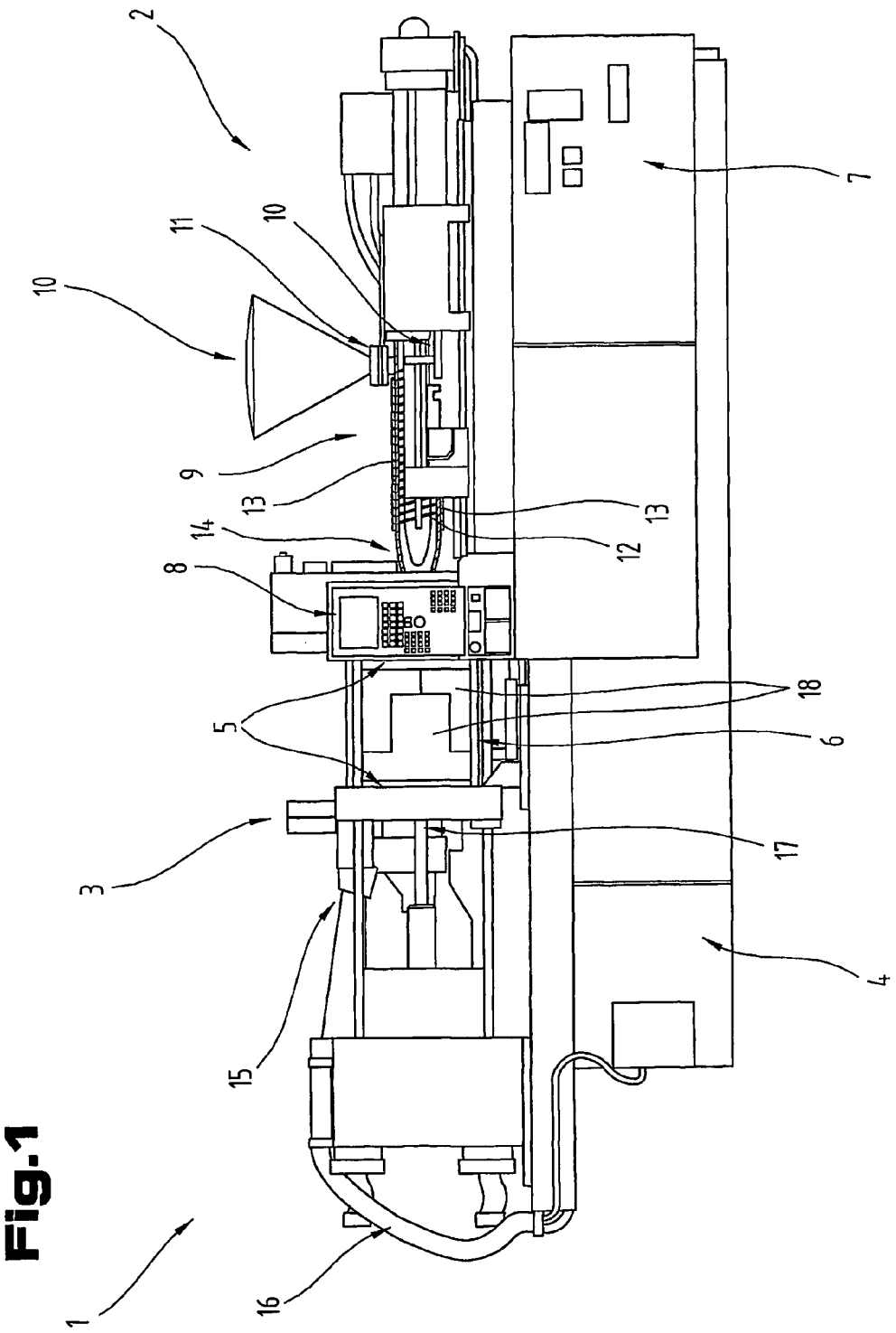

| | | | |
|---|---|---|---|
| 5,355,482 A | | 10/1994 | Ohhashi et al. |
| 5,539,650 A | * | 7/1996 | Hehl .............................. 700/200 |
| 5,621,639 A | * | 4/1997 | Fray ................................ 700/86 |
| 6,157,864 A | * | 12/2000 | Schwenke et al. .............. 700/79 |
| 6,255,411 B1 | * | 7/2001 | Hartley et al. .................. 526/88 |
| 6,256,598 B1 | * | 7/2001 | Park et al. ......................... 703/2 |
| 6,338,004 B1 | * | 1/2002 | Usui .............................. 700/200 |
| 6,553,268 B1 | * | 4/2003 | Schwenke et al. .............. 700/18 |
| 6,993,456 B2 | * | 1/2006 | Brooks et al. .................. 702/183 |
| 8,163,208 B2 | * | 4/2012 | Fitzpatrick ................... 264/40.1 |
| 8,165,863 B2 | * | 4/2012 | Noetzelmann et al. ......... 703/13 |
| 8,229,591 B2 | * | 7/2012 | Betsche ........................ 700/200 |
| 2004/0135291 A1 | * | 7/2004 | Pearson ...................... 264/328.1 |
| 2004/0181293 A1 | | 9/2004 | Tanizawa et al. |
| 2004/0210868 A1 | | 10/2004 | Dutsch et al. |
| 2005/0278638 A1 | * | 12/2005 | Pfahlmann .................... 715/734 |
| 2005/0278670 A1 | * | 12/2005 | Brooks et al. ..................... 716/5 |
| 2007/0235901 A1 | * | 10/2007 | Akopyan .................... 264/328.1 |
| 2008/0069915 A1 | * | 3/2008 | Busse et al. ................... 425/155 |
| 2008/0120532 A1 | | 5/2008 | Lange et al. |
| 2009/0053546 A1 | * | 2/2009 | Di Domenico ............... 428/544 |
| 2009/0057938 A1 | * | 3/2009 | Zhang .......................... 264/40.1 |
| 2010/0063606 A1 | * | 3/2010 | Noetzelmann et al. ......... 700/86 |

FOREIGN PATENT DOCUMENTS

| | | | | |
|---|---|---|---|---|
| DE | 101 12 438 | | 10/2002 | |
| DE | 103 08 816 | | 5/2004 | |
| EP | 0774701 | * | 5/1997 | ........... G05B 19/416 |
| EP | 1077396 | * | 2/2001 | ............. G05B 19/05 |
| EP | 1 890 208 | | 2/2008 | |
| EP | 1 923 755 | | 5/2008 | |

OTHER PUBLICATIONS

International Search Report.

Seungjoo Lee et al., "Automatic Generation of Logic Control," [Online] 2006, pp. 1-49, XP-002531933, retrieved from the Internet on Jun. 9, 2009: http://erc.engin.umich.edu/publications/TechReport61.pdf (ISR).

Johan Richardsson, "A Survey of Tools and Methods for Design of Automated Production Plants," ISR2002 33$^{rd}$ International Symposium on Robotics, Stockholm, Sweden, Oct. 2002, pp. 391-396, XP-009118118. (ISR).

"eM-PLC and Step 7 Professional—eMPower for manufacturing process management," Tecnomatix, [Online] 2005, pp. 1-3, XP-002532350, retrieved from the Internet on Jun. 9, 2009: http://www.plma/com/au/iPublish/archives/1/080.010.040/5429/fs_tecnomatix_plc_step_tcm53-4944.pdf.

* cited by examiner

CONFIGURATION OF MACHINE PROCESSES

CROSS REFERENCE TO RELATED APPLICATIONS

This application is the National Stage of PCT/AT2009/000061 filed on Feb. 19, 2009, which claims priority under 35 U.S.C. §119 of Austrian Application No. GM 116/2008 filed on Feb. 26, 2008, the disclosure of which is incorporated by reference. The international application under PCT article 21(2) was not published in English.

The invention relates to a method enabling a user to create, edit, monitor and/or optimize the overall machine process of a programmable machine with the assistance of a graphics editor, and a device for carrying out the method.

Numerous methods permitting the use of programmable machines are known from the prior art, such as used in manufacturing with a view to pre-configuring a fully or partially automated work process, for example. In this connection, these machines include those used in manufacturing and processing for industrial mass production in particular, such as injection moulding machines or sheet metal bending machines, which come in the form of a basic variant equipped with different optional functional units or which can be configured to run different processing sequences depending on the product or workpiece being manufactured or processed. As a rule, such machines comprise a plurality of machine units, which co-operate in a coordinated manner to run the desired production process or the desired overall machine process. The basic functions available on the machine units are predefined by the machine manufacturer and the specific technical fittings of the machine. However, the machine operator or user can only set parameters for these basic functions and combine them to set up the requisite processing sequence within limits permitted by the manufacturer. In this respect, the user is able to change settings of the configuration by means of a control panel in order to coordinate the requisite system components as well as set up synchronisation, numerical settings, monitoring and optimisation tasks, make various adjustments and such like. Rules are devised from these inputs in order to generate control signals, which essentially influence the work process which will subsequently be run by the machine on the basis of the fully or partially automated process. Depending on the process, it will be necessary to keep to specific sequences and synchronisations when combining the partial machine processes. In the case of mass production in particular, it is also necessary to ensure that process cycle times are as short as possible per workpiece in order to make optimum use of the machine's capacity. Correct co-ordination of the timing for partial machine processes is therefore an important but very demanding task for the user.

The disadvantage of known programming methods is that the user at the control panel is required to run through what are already time-consuming and wearisome control actions just to gain an overall view for configuring the layout of individual time sequences relating to partial machine processes taking place in an overlapping or parallel arrangement along the time axis for generally different machine units, i.e. in order to synchronise the system of all partial machine units, for example opening individual menus and displays, obtaining the key timing data from these displays, make mental numerical comparisons of this timing data and write it down if additional help is not available from the graphics editor, which will be discussed in more detail below. The wearisome prescribed control procedure has to be followed again from scratch with every change made to the configuration of the overall machine process.

However, another disadvantage of the known methods is that during configuration, the user is not able to tell how the partial machine processes of every individual machine unit are distributed across the overall machine cycle in terms of their number, duration and relative timing. However, it is precisely this information that is of critical importance when it comes to monitoring individual machine units.

Yet another disadvantage of the known methods, finally, is that there is no way of obtaining a single view indicating which machine units are involved in the overall machine process, which partial machine processes are assigned to which machine units and which machine units are active in which phase of the machine cycle.

These problems are particularly prevalent in those configuration methods where the user relies on diagrams of the overall machine process based on flow charts for configuration purposes. The timing overlaps of partial machine processes which often occur in overall machine processes cannot be seen by the user in one view in this system and instead have to be determined by adding the process times of every process branch—for example if several sequences of partial machine processes take place alongside one another—and then comparing the process times, which at best are already displayed next to the process symbols. In order to determine which partial machine processes are involved in the overall machine process at all, it is necessary to search through the entire flow chart to find various process symbols. Similarly, it is necessary to browse through the entire process diagram in order to ascertain the number of partial machine processes of a machine unit in the context of a machine cycle and their timing in the machine cycle generally has to be sorted by a wearisome process of adding process times and comparing them. These partial tasks, which are tiresome for the user and susceptible to errors, are extremely obstructive in terms of running a rapid and reliable configuration process.

Naturally, one option would be to create sub-programmes for all these partial tasks—as the skilled person would do if faced with the problems outlined above—which then deliver their results to the user in the form of additional tables or by some other means of output, for example. For a configuration procedure to be fluid and reliable, however, a preferred solution is one where the user is presented with a single diagram showing all of the information mentioned above needed for configuration and monitoring purposes, based on a specially designed structure rather than in the form of several disparate information units. There is a desire for an interactive and intuitive form of programming the machine process making specific allowance for the time duration and in particular the time limitation of the individual partial machine processes involved.

Accordingly, one objective of this invention is to propose a method of configuring and monitoring overall machine processes, which provides the user with a rapid overview of as many details as possible of the set-up of the overall machine process made up of partial machine processes relevant to configuration and monitoring to assist with the control actions which have to be undertaken in the context of a single, compact diagram. In particular, the user should be provided with an overview not only of partial machine processes running more or less in parallel and their assignment to the machine units, but also of their time restriction and synchronicity. Another objective is to propose a device suitable for implementing this method.

This objective is achieved in accordance with the invention, due to the fact that the overall machine process is compiled and all other essential configuration settings are entered from a single two-dimensional process diagram, the diagram area of which is bordered by an imaginary or visualized machine system axis in a machine component dimension and an imaginary or visualized process time axis in a time dimension. All the partial machine processes involved in the overall machine process are entered in this diagram area with the aid of the graphics editor by a fully automated or user-initiated, partially automated positioning or re-positioning of associated process symbols, which takes place in the machine component dimension based on their assignment to a machine unit and in the time dimension based on the requisite technical synchronization with other partial machine processes desired by the control person. For synchronization purposes, at least one instant of the defined process time for every partial machine process is defined as a synchronization instant, which is technically permissible as the timing link to a synchronization instant of another partial machine process of the same or another machine unit. This timing link is incorporated in the diagram by the graphics editor by positioning the associated process symbols extending in the direction of the process time axis in the following manner. In the case of two partial machine processes belonging to different machine units which have to be synchronized, the synchronization is displayed in such a way that the linked synchronization instants are graphically displayed by placing the so-called linking instants so that they are arranged jointly on an imaginary or displayed line extending parallel with the machine system axis, referred to hereafter as the synchronization line. At a synchronization instant of a partial machine process, there may be a single linking point or several linking instants—depending on the shape of the process symbol. In the case of two partial machine processes belonging to the same machine unit which have to be synchronized, the synchronization is displayed in the same way in principle. In this instance, however, the synchronization line evolves into a point which coincides with the two linking instants of the linked synchronization instants.

It is of advantage to set the at least one synchronisation instant of a partial machine process within the defined process period because this enables the duration of the overall machine process to be kept as short as possible with a view to maximising productivity of the programmable machine or system. In the first instance, the starting instant and terminating instant of the process duration of a partial machine process may be used as synchronisation instants in particular. In the case of more complex partial machine processes which in turn incorporate several partial processes, process stages or statuses, synchronisation instants may also have to be set or may be more meaningful within the open process period.

The information which can be gleaned from this process diagram in accordance with the invention satisfies the requirements set by the objective of the invention in numerous ways. The number of all the machine units involved in the overall machine process plotted along the machine system axis in the machine component dimension directly provide an overall view of the machine units involved in the overall process and an overall view of the timing of all the partial machine processes is obtained directly from the synchronized arrangement of all the partial machine processes in the direction of the process time axis. A separate overall view of the timing of the partial machine processes of every individual machine unit is obtained anyway due to the fact that the matrix-type structure of the process diagram exclusively displays all the partial machine processes of a respective machine unit on an exactly delimited area of the diagram area of the process diagram from the outset and hence provides a single view of a partial display in a synchronized arrangement along the process time axis. This matrix-type structure is of particular advantage because, on the one hand, the user is able to tell when and in which phases of a machine cycle a specific machine unit is active or involved and, on the other hand, the user also has a single view showing which machine units in a specific phase of the machine cycle are active or involved simultaneously. This not only provides a simple way of viewing the structural interaction of the machine units but also the timing.

The user is also able to tell relatively easily which partial machine processes are ultimately decisive for the overall cycle duration and hence of particular importance in terms of optimising productivity for the mass production process. However, it is also easy to tell which partial machine processes might possibly be delayed in time, for example with a view to obtaining an improvement or optimisation, without increasing the overall cycle time. In this connection, this might specifically involve reducing or optimising the peak performance of the machine as a whole, consumption of compressed air, mechanical load or noise nuisance.

Other advantageous effects of the method proposed by the invention and the device proposed by the invention are a reduction in resources for re-training a user, as well as a reduction in the likelihood of operating errors and the possibility of the user reacting more rapidly to undesired or erroneous operating states of the machine.

The expression process-related waiting times is used here as meaning waiting times assigned to at least one partial machine process which are regarded as technically necessary timing pre-runs or after-runs. In terms of taking a systematic view, it is very much of advantage to categorize these waiting times under the partial machine processes in accordance with an embodiment of the invention.

Since it is often practical to set these waiting times so that they are not based exclusively on the respective minimum waiting times required due to the prevailing physical and/or chemical process conditions, but to make them longer based on the user's technical experience of configuring and monitoring the overall machine process, it is recommendable to set the waiting times in accordance with this embodiment.

Another embodiment includes the further features that a two-value process option is displayed for at least one partial machine process, in particular the selection of a machine movement or its opposing movement, due to the possibility of being able to orient the associated process symbol in each of the two opposing directions parallel with the process time axis, and every process symbol of such a pair of process symbols is created from the respective other one, in particular due to a mirror image on an axis in mirror image parallel with the machine system axis. This embodiment provides an advantageous way in which the technical information available to the user for configuration and monitoring purposes can be condensed by the process diagram, which is achieved due to the fact that at least one process symbol is displayed so that it is oriented in one of the two directions of the time sequence axis and is thus able to display a process option with two values, in particular a pair of motion routines which might be interpreted in different ways, consisting of a machine movement and its opposing movement. A machine movement and its opposing movement might be two opposing movements of a machine unit in translation for example, or two rotating movements of a machine unit, one of which takes place in the clockwise direction and the other in the anti-clockwise direction so that the two axial vectors of the angular speed are directed opposite one another, or alternatively two machine movements which are opposite to one another irrespective of their specific kinematic aspect, in which case they may be opposite because one of the machine movements is used to open and the other to close a machine unit, for example.

Another embodiment relates to the method steps at the beginning of the method proposed by the invention, starting with the set-up of the programmable machine or system comprising individual machine units and the continuation of this method with a view to obtaining a fully or partially automated configuration of the overall machine process. These method steps involve in particular intervention by the user in order to transfer the configuration data of an already stored configuration and initiate a fully automated re-configuration or make partially automated changes to a stored configuration or a partially automated re-configuration of an overall machine process. The advantage of this is that the described user intervention associated with these introductory method steps achieves the desired objective very easily and rapidly.

A method step sequence which has proved to be very important in practice is one which leads to rapid initial operation of the programmable machine with configuration data that is stored and has already been tried and tested, in particular standard configurations supplied by the manufacturer or configuration data to which slight changes have been made. In this case, the user selects the machine system axis of the process diagram—if necessary after switching to a special operating mode, for example having selected the "Programming" operating mode with the aid of an operating mode selection switch—retrieves from the graphics editor a list of all the stored configurations presented in the form of a selection menu, selects one of these configurations thereby prompting the symbols belonging to the machine units of this configuration to be entered on the machine system axis and the partial machine processes used in this configuration to be placed in the diagram area of the process diagram by means of their process symbols, after which he then has the option, provided he has the requisite authorisation, of enabling the machine controller to accept the configuration data and start up the overall machine process in accordance with the desired operating mode, for example by initiating one of the operating modes "Automatic" or "Semi-automatic" from the operating mode selection switch.

If the user wishes to edit the configuration retrieved from the memory prior to start-up, he opens the partially automated configuration needed for this purpose in a special operating mode, for example in the "Programming" operating mode, by selecting the symbol of one of the machine units for which at least a partial machine process has to be edited, runs this partially automated configuration and then starts the real overall machine process by selecting one of the operating modes "Automatic" or "Semi-automatic" with the aid of the operating mode selection switch.

Another method step sequence which is very important in practice is that used to re-configure the overall machine process. The user opens a catalogue of the graphics editor for machine units—for example in the "Programming" operating mode—, selects from it all the machine units assigned to the new overall machine process and, by confirming this selection, then prompts the symbols belonging to the machine units of this configuration to be entered on the machine system axis. If he now selects the machine system axis, he will trigger a fully automated configuration of this overall machine process by the graphics editor. It puts together under the partial machine processes a standard selection of all of machine units selected from the catalogue by the user, synchronises them and enters the parameters for them based on standard settings and transfers this selection to the diagram area of the process diagram as partial machine processes by means of their process symbols. In the same way as described above, the user also has the option in this case of either starting up the overall machine process immediately by re-setting the operating mode selection switch, for example from the "Programming" operating mode to one of the operating modes "Automatic" or "Semi-automatic", or firstly running a partially automated change to this configuration. However, partially automated configuration of the overall machine process can also be run immediately after confirming the user-prompted selection of all the machine units from the catalogue of the graphics editor involved in the overall machine process, in which case the user—instead of selecting the machine system axis—continues with the method proposed by the invention by selecting the symbol for one of those machine units on the machine system axis for which he wishes to edit at least one partial machine process.

Another embodiment provides an advantageous method whereby a user can select and synchronize, on a partially automated basis, at least a partial number from the quantity of all partial machine processes involved in an overall machine process. In order to create settings or add to settings of the overall machine process, the user starts in a first selection step by selecting the symbol of the machine unit by means of which the desired partial machine process should be run, thereby opening a menu or selection window displaying a number of partial machine processes available for and which can be used with this machine unit, from which he selects the desired partial machine process in the second selection step. The user is then presented with a display in the diagram area by the graphics editor, showing all of the linking instants of partial machine processes previously existing in the overall machine process and optionally any pre-existing synchronization lines permissible for this partial machine process in order to permit synchronization. In the third selection step, the user then selects a linking point, a synchronization line or the machine system axis and thus sets the synchronization for the new partial machine process to the pre-existing overall machine process. The graphics editor then positions the process symbol of the new partial machine process on the diagram area depending on the machine unit to which it belongs and its synchronization with the overall machine process and if necessary adds a synchronization line between the start linking point of the new process symbol and the linking point selected by the user.

The advantage of the method in another embodiment resides in the fact that the configuration work is made easier for the user because in all situations in which the selected partial machine process is reversible or carries a process option with two values and it is absolutely necessary to run whichever is the complementary process option within a machine cycle because of the cyclic nature of the overall machine process, the graphics editor, once the user has selected the partial machine processes, also automatically selects the complementary partial machine process or a supplementary partial machine process in order to return the relevant machine unit to a defined base position, and displays in the diagram area all of the synchronization lines and linking instants of process symbols of the pre-existing overall machine process needed to set up the synchronization of the two partial machine processes, identifying every synchronization line and every linking instant assigned to one of the two partial machine processes so that the two partial machine processes will subsequently synchronized with the pre-existing machine process.

Another embodiment provides the advantageous user option whereby during partially automated synchronization, only some of the partial machine processes have to be manually synchronized and once a defined manual synchronization has been confirmed, the fully automated synchronization of the as yet non-synchronized partial machine process is initiated by the graphics editor or by a sub-program called up by it, and the process symbols belonging to the fully automated synchronized partial machine process are correctly entered in the process diagram based on the correct synchronization and machine component dimension.

The feature in another embodiment is also of advantage as regards providing better clarity and reliability during machine operation because a graphic display based on synchronization lines or linking instants or an additional tabular display of at least some of all of the synchronization instants already entered during the course of setting up the process diagrams are shown by additional symbolic or verbal entries in the diagram area or in a window merged into it, providing a technical guide to assist the user in making selections.

Another embodiment of the process diagram which is of advantage to the method proposed by the invention because it is more precise takes the form of all process symbols presented in the direction of the process time axis in the correct order of timing for the process duration.

Another embodiment provides an advantageous method of making the information relating to the partial machine processes and needed by the user to perform at least the configuration and monitoring tasks proposed by the invention even more compact within the scope of the process diagram. There is absolutely no reason why the machine system axis of the process diagram cannot display yet other axis portions that are different, in particular physical dimensions, in addition to the continuous machine component dimension, in which case the graphical process symbols are entered in the process diagram together with the generally different parameter settings assigned to the individual machine units extending accordingly in the direction of the machine system axis. The parameters which might be entered in such a display include, for example, kinematic and kinetic parameters such as distances traveled, speeds, rotation speeds and circuit frequencies, accelerations, angular accelerations, impulses, rotary impulses, forces, masses, etc. Other examples of parameters which might meaningfully be displayed in the above manner are the recorded machine power, noise measurements, mechanical load or similar variables which might be used as a basis for achieving further optimization.

In situations where process durations of the partial machine processes differ markedly and all the process symbols have been plotted accordingly in the correct order of process duration in the direction of the process time axis, another embodiment provides a way of improving the method proposed by the invention by introducing scaling, which help to balance the display size of the process symbols in the direction of the process time axis by at least partially compressing and/or stretching the process time axis, thereby ensuring that every two computed or technically determined graphic linking elements disposed immediately adjacent to one another, in other words either linking instants or synchronization lines, are maintained at a predefined minimum distance irrespective of the way they are actually displayed in the process diagram in readiness for selection by the user.

Another embodiment offers a clear overall view of the process diagram due to the condition whereby the overall machine is only made up of machine units which are able to run no machine processes or precisely one partial machine process at any one time. Otherwise, running at least two of the partial machine processes of one and the same machine unit at the same time would mean that the associated process symbols would at least partially overlap with one another in the way they are displayed in the process diagram. A display of this type, which is not helpful to the user, can be avoided simply by opting for a further practical subdivision into more complex machine units.

Another embodiment provides an advantageous way for the user to enter parameters for a partial machine process by means of the process diagram in the case of a partially automated configuration of the overall machine process. The user selects associated graphic process symbols already displayed in the process diagram, prompting an input or selection menu to open, by means of which the user enters parameter values or selects setting options.

Another embodiment advantageously offers an improvement in efficiency in terms of configuring machine processes as proposed by the invention and also satisfies the requirement of significantly reducing the number of parameters which have to be entered. A fully automated re-configuration of an overall machine process is run with standard parameter values and, when a stored configuration is retrieved, stored parameter values are loaded. Any change which would have to be made to the parameter settings in any case requires the least amount of time in both cases and offers the most reliable way of ruling out input errors because it is only necessary to access those parameters which have to be actually edited.

The approach in another embodiment offers an easy way of helping the user to monitor several qualitatively different parameters of at least one partial machine process of a specific machine because these parameter values are output in the area disposed directly adjacent to the associated process symbol.

Another embodiment presents a special situation which assists the user in terms of intervention in the process diagram with a view to obtaining optimization in the context of the method proposed by the invention. The graphics editor or a sub-program called up by it monitors the machine cycle times. If delayed times are detected, an optimization computation incorporating the overall machine process or a group of partial machine processes or even just a single partial machine process is run, the results of which and/or suggested parameter changes based on them relating to the partial machine process incorporated in the optimization computation are output in graphic format and/or as a table in the process diagram together with an associated findings report.

Another embodiment lists various physical variables which have a decisive influence on an injection molding machine, representing special variables for parameters which can advantageously be edited as part of the parameter setting routine in accordance with the preceding embodiments. The parameters of the partial machine processes including metering and/or injecting and/or after-pressure and/or a cooling process and/or de-molding within the context of the overall machine process of an injection molding machine include the critical physical variables of cylinder temperature, screw rotation speed and velocity, dynamic pressure, metering time and screw retraction, injection speed, injection pressure and injection time, after-pressure level and after-pressure time, cooling time and/or opening force and ejection force.

In another embodiment the right angle subtended by the machine system axis and the process time axis of the process diagram is displayed as the most advantageous special situation of an angle between axes when using the process diagram in the context of the method proposed by the invention. Although other angles would also be conceivable, they tend to be impractical.

Another embodiment uses right-angled and isosceles triangles as two advantageous shapes for process symbols in the method proposed by the invention—being simple yet particularly meaningful for use in the process—diagram. Accordingly, with a view to enabling a rapid differentiation between different types of partial machine processes for the process-related waiting times, not only can a different shape of triangle be used, the area bounded by the triangle can additionally be filled. The extension of the right-angled triangles parallel with the machine system axis may be used to display parameters which are common to all the partial machine processes of a machine unit, for example. The fact that the triangle symbols can be oriented in two opposite directions parallel with the process time axis also means that allowance can be made for the requirements involved in display two opposing process options.

Another embodiment offers the advantageous option of refining the hierarchy of the process diagram within the scope of the method proposed by the invention. In the case of complex overall machine processes, a situation may arise in which the size of the screen of the control panel in conjunction with the limited resolution of the screen is not sufficient to display to the user all the process structures clearly enough for the various functions of the method proposed by the invention in a single system level. In this respect, the ability to display partial structures in detail in hierarchically lower system levels disposed behind in the process diagrams is an effective aid, provided the elements of the structure are also of an identical layout in the hierarchically lower system levels and can be manipulated in exactly the same way without restrictions or behave in exactly the same way as those in the highest system level.

The features in another embodiment advantageously cater for those in-between situations of the method proposed by the invention which occur due to human error due to the user's actions or due to a processing error or technical failure of at least one machine unit during implementation of the method, e.g. during monitoring of a production process. If plausibility checks uncover an inputting error on the part of the user, the user can be prompted to repeat the input and/or his input prompts an error message. In the event of processing errors or technical failure of a machine unit when the programmable machine or system is running and in monitored mode, error messages can also be output, for example in a window inlaid in the process diagram.

Figure 2:
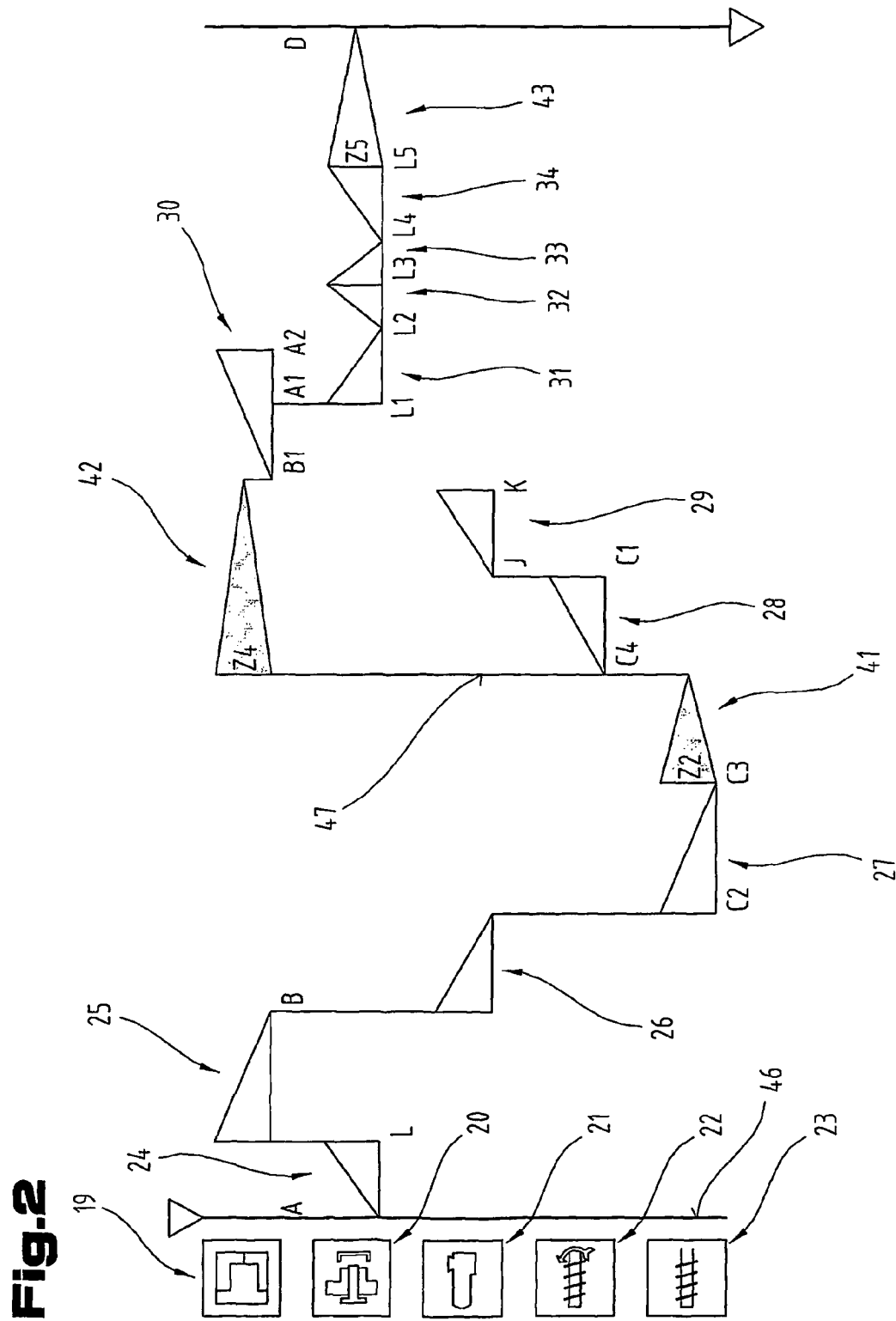

A specific example of an embodiment of an overall machine process configured using the method proposed by the invention is in the form of a machine cycle of an injection molding process using the display in the process diagram illustrated in FIG. 2. In this embodiment, the overall machine process is represented by a machine cycle or a series of several machine cycles of an injection molding process and the typical partial machine processes of a machine cycle are displayed with typical process durations in brackets by the process steps "elector back", "close mold (1s)", "worm screw unit forward (0.8s)", "inject (2s)", "after-pressure phase (7s)", "meter and start plasticization (4s)" and "de-pressurize screw and move worm screw unit back (1.2s)" and, during cooling of the molding, "open mold (0.8s)", "ejector forward and back (1s); several strokes possible" and "wait between cycles (26.8s)".

In another embodiment, the means necessary for inputting configuration data might be input pens or manually controlled navigation devices fixedly mounted on the control panel for example, whilst the means used for electronic data processing in real time are primarily micro-computers, in other words micro-controllers and/or signal processors, and the means used to provide a graphic display of the process diagram might be touch screens or other types of LCD or TFT screens, and as regards the control panel usually integrated in programmable production machines, the configuration data is transmitted by means of screened electric cables as a rule.

Another embodiment provides an advantageously integrated online graphics editor, in other words a graphics editor capable of linking into the real time processing system of the machine or system controller, and a further embodiment provides a touch screen for implementing the method proposed by the invention which is particularly practical in terms of the design of the control panel.

Specific embodiments of machine units of an injection molding machine for implementing the method proposed by the invention are schematically illustrated in a simplified format in FIG. 1. In one embodiment, the injection unit includes a worm screw unit incorporating a hopper and filler neck, which belong to a cylinder with a screw, heating belts and a nozzle, an applicator unit for moving the entire worm screw unit in the axial direction and a drive for axial translating movements and/or rotating movements of the screw.

Figure 3:
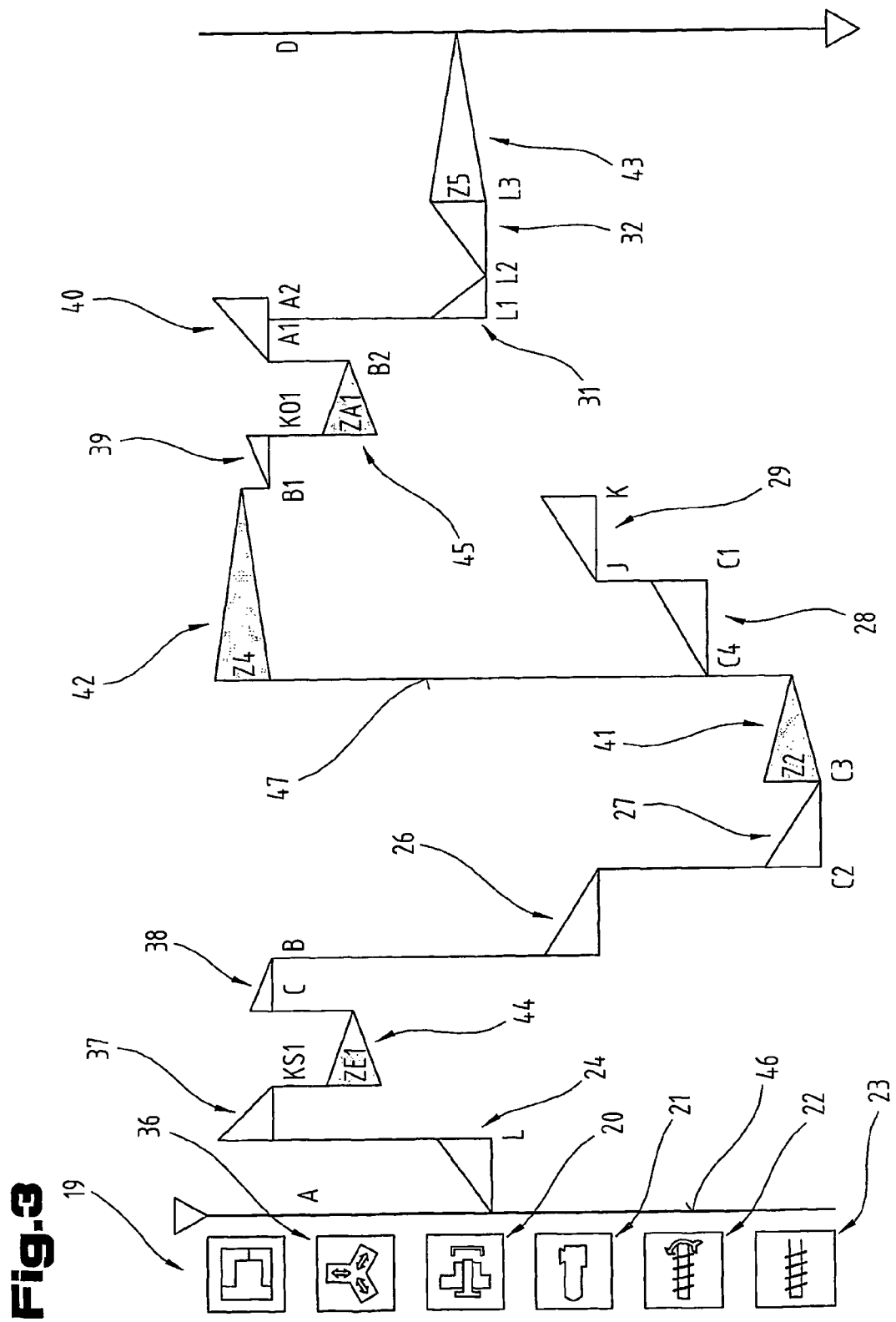

Specific examples of embodiments of means for implementing the method proposed by the invention, on the one hand, and the results of implementing the special method steps of the method proposed by the invention, on the other hand, will now be described and illustrated. Of the drawings FIG. 1 is a simplified, schematic diagram illustrating the structure of an injection moulding machine made up of its individual machine units—both the overall machine and its machine units constitute means for implementing the method proposed by the invention;

FIG. 2 shows the qualitatively presented result of synchronising a machine cycle of an injection moulding machine without core puller representing an example of a method step of the method proposed by the invention and FIG. 3 shows the qualitatively presented result of editing a configuration of the overall machine process of the injection moulding machine illustrated in FIG. 2 with the number of its machine units increased by adding a core puller and adapting both the number of its partial machine processes and their synchronisation and parameter settings, representing method steps of the method proposed by the invention.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

FIG. 1 is a simplified, schematic diagram illustrating the structure of a programmable injection molding machine 1 made up of its individual machine units, such as used both as an overall machine and as individual machine units in individual embodiments as specific means for implementing the method proposed by the invention and as might be used in the plastic processing industry, for example, to manufacture plastic components of thermosetting plastic.

The main functional units of the injection moulding machine 1 are an injection unit 2, a closing unit 3, a machine bed 4 with clamping plates 5 for clamping a mould in its place 6 and finally a drive and control system 7 with a control panel 8 constituting the user interface. In terms of components, the injection unit 2 comprises a worm screw unit 9, a hopper 10 and a filler neck 11, the worm screw unit 9 being made up of partial components comprising a cylinder with a screw 12, heating belts 13 and a nozzle 14. The closing unit 3 comprises at least one knee lever 15, a hydraulic line 16, an ejector 17 and a mould 18 as individual components.

Of these machine components, the following machine units were used or used in co-operation with one another to implement the method proposed by the invention for obtaining the synchronisation result illustrated in FIG. 2: the mould 18 represented by a symbol 19, the ejector 17 represented by a symbol 20, the worm screw unit 9 represented by a symbol 21, the system of the screw 12 together with a drive sub-unit for conveying and plasticising the material represented by a symbol 22 and the system of the screw 12 together with a drive sub-unit for the injection process represented by a symbol 23.

With reference to the method in accordance with the invention, the explanations given above in this connection and the fact that it is not the linking instants which are shown in FIG. 2—or in FIG. 3—but the associated synchronization instants, FIG. 2 illustrates examples of the following partial machine processes plotted along the process time axis as proposed by the invention to provide an overall view of their timing: a reversing movement 24 of the ejector 17 positioned at the start of the machine cycle with a start time and end time A respectively L, a closing operation 25 of the mold 18 by means of a forward movement of its moving part with a start and end time L respectively B, a forward movement 26 of the worm screw unit 9 for applying the nozzle 14 to the injection passage of the mold 18 with a start and end time B respectively C2, a forward movement 27 of the screw 12 for injecting the plasticized plastic with a start and end time C2 respectively C3, a phase 41 of after-pressure in the forward direction constituting a process-related waiting time with a start and end time C3 respectively C4, a reversing movement 28 of the screw 12 required for metering purposes with a start and end time C4 respectively C1, a reversing movement 29 of the entire worm screw unit 9 to decompress and set down the nozzle 14 with a start and end time J respectively K, a concurrent, overlapping cooling time 42 at the latter two partial machine processes constituting a process-related waiting time with a start and end time C4 respectively B1, opening 30 of the mold 18 by a reversing movement of its moving part with a start and end time B1 respectively A2 and a synchronization instant A1 lying within the open process period for starting a forward movement 31 of a first stroke of the ejector 17 with a start and end time L1 respectively L2, a reversing movement 32 of the first stroke of the ejector 17 with a start and end time L2 respectively L3, a forward movement 33 of a second stroke of the ejector 17 with a start and end time L3 respectively L4, a reversing movement 34 of the second stroke of the ejector 17 with a start and end time L4 respectively L5 as well as a process-related between-cycle waiting time 43 with a start and end time L5 respectively D. The heights of the right-angled triangles in this diagram represent distances traveled from a specific reference point of the associated machine units.

FIG. 3 illustrates another embodiment of a process diagram used as a means of implementing the method proposed by the invention, which may be construed as an independent embodiment in its own right, the same reference numbers and component names being used to denote parts that are the same as those described in connection with FIG. 2. To avoid unnecessary repetition, reference may be made to the detailed description given in connection with FIG. 1 and FIG. 2 above.

Compared with FIG. 2, significant changes have been made to the configuration of the overall machine process of the injection moulding machine, including its make-up of individual machine units and partial machine processes and their synchronisation and parameter settings in the process diagram as a result of running the appropriate method steps of the method proposed by the invention. The number of all the machine units involved in the overall machine process has been increased by a core puller 35 represented by the symbol 36, the number of all the partial machine processes has been increased by breaking down the closing and opening procedure of the mould 18 into two partial processes, namely a main closing and sealing operation respectively pre- and full opening operation of the mould 18 represented by the corresponding symbols 37 and 38 respectively 39 and 40 on the one hand, and reduced by omitting the forward movement 33 and reversing movement 34 of the second stroke of the ejector on the other hand. Clearly visible to a high quality are the differences in the opening and closing distances between the main closing and sealing operation respectively the pre- and full opening operation plotted by the corresponding symbols 37 and 38 respectively 39 and 40 in the direction of the machine system axis, as well as the requisite changes to the process durations of individual partial machine processes. The list of partial machine processes after editing the configuration now comprise the reversing movement 24 of the ejector 17 disposed at the start of the machine cycle with the start and end time A respectively L, the main closing operation 37 of the mould 18 by the forward movement of its moving part with the start and end time L respectively KS1 and long closing distance, retraction 44 of the core puller 35 constituting a process-related waiting time with the start and end time KS1 respectively C, the operation of sealing 38 the mould 18 by the forward movement of its moving part with the start and end time C respectively B and short closing distance, the forward movement 26 of the worm screw unit 9 with the start and end time B respectively C2 in order to apply the nozzle 14 to the injection passage of the mould 18, the forward movement 27 of the screw 12 in order to inject the plasticised plastic with the start and end time C2 respectively C3, the phase 41 of after-pressure in the forward direction constituting a process-related waiting time with the start and end time C3 respectively C4, the reverse movement 28 of the screw 12 needed for metering purposes with the start and end time C4 respectively C1, the reversing movement 29 of the entire worm screw unit 9 with the start and end time J respectively K in order to decompress and set down the nozzle 14, the concurrent, overlapping cooling time 42 running during the latter two partial machine processes constituting a process-related waiting time with the start and end time C4 respectively B1, an operation of pre-opening 39 the mould 18 by a reversing movement of its moving part with the start and end time B1 respectively K01 and short opening distance, extraction of the core puller 35 constituting a process-related waiting time 45 with the start and end time K01 respectively B2, an operation of fully opening 40 the mould 18 by a reversing movement of its moving part with a start and end time B2 respectively A2 with a long opening distance and a synchronisation instant A1 lying within the open process period for starting the forward movement 31 of a stroke of the ejector 17 with a start and end time L1 respectively L2, the reversing movement 32 of this stroke of the ejector 17 with a start and end time L2 respectively L3 as well as the process-related between-cycle waiting time 43 with a start and end time L3 respectively D.

The advantages of the inventive method described in detail above as regards the general layout of the process diagram are immediately obvious from FIG. 2 and FIG. 3 without further explanation. Of the two axes of the process diagram, the process time axis is not illustrated in these examples and must therefore be imagined, whereas the machine system axis 46 is displayed. As illustrated, the diagram of the synchronisation line 47, for example, is urgently recommended at least as a means of enabling the user to monitor overall machine processes.

The embodiments illustrated as examples in FIG. 1 respectively FIG. 2 and FIG. 3 represent possible variants of an injection moulding machine and the layout of the process diagram as a means of implementing the method proposed by the invention, and it should be pointed out at this stage that the means for implementing the inventive method are not specifically limited to the variants specifically illustrated, and instead the individual variants may be used in different combinations with one another and these possible variations lie within the reach of the person skilled in this technical field given the disclosed technical teaching. Accordingly, all conceivable variants which can be obtained by combining individual details of the variants described and illustrated are possible and fall within the scope of the invention.

For the sake of good order, finally, it should be pointed out that, in order to provide a clearer understanding of an injection moulding machine and the process diagram as a means of implementing the inventive method, they and their constituent parts are illustrated to a certain extent out of scale and/or on an enlarged scale and/or on a reduced scale.

Above all, the individual embodiments of the subject matter illustrated in FIG. 2 and FIG. 3 constitute independent solutions proposed by the invention in their own right. The objectives and associated solutions proposed by the invention may be found in the detailed descriptions of these drawings.

LIST OF REFERENCE NUMBERS

1 Injection moulding machine
2 Injection unit
3 Closing unit
4 Machine bed
5 Clamping plates
6 Place for mould
7 Drive and control system
8 Control panel
9 Worm screw unit
10 Hopper
11 Filler neck
12 Screw
13 Heating belts
14 Nozzle
15 Knee lever
16 Hydraulic line
17 Ejector
18 Mould
19 Symbol for mould
20 Symbol for ejector
21 Symbol for worm screw unit
22 Symbol for plasticiser system
23 Symbol for injection system
24 Safety reversing movement of ejector
25 Full closure of the mould
26 Applying the worm screw unit
27 Injecting
28 Metering
29 Decompressing and depositing
30 Full opening of the mould
31 $1^{st}$ forward stroke of the ejector
32 1st reverse stroke of the ejector
33 $2^{nd}$ forward stroke of the ejector
34 $2^{nd}$ reverse stroke of the ejector
35 Core puller
36 Symbol for core puller
37 Main closing of the mould
38 Sealing the mould
39 Pre-opening the mould
40 Full opening of the mould
41 After-pressure phase
42 Cooling time
43 Between-cycle waiting time
44 Retraction of the core puller
45 Extraction of the core puller
46 Machine system axis
47 Synchronisation line

The invention claimed is:

1. A method for enabling a user to create, edit, monitor or optimize an overall machine process of a programmable machine or system using a graphics editor, wherein the machine or system comprises a plurality of separately activated machine units for control purposes, said method comprising the steps of:
 (a) respectively assigning a plurality of predefined partial machine processes to the plurality of machine units;
 (b) setting parameters for at least one partial machine process of the plurality of predefined partial machine processes;
 (c) using a respective graphic process symbol of the graphics editor to refer to each partial machine process of the plurality of predefined partial machine processes;
 (d) defining at least one respective synchronization instant for each partial machine process of the plurality of predefined partial machine processes;
 (e) setting up the overall machine process by selecting a partial quantity from all the predefined partial machine processes and linking the at least one synchronization instant for each partial machine process;
 (f) deriving at least some control signals for operating the programmable machine or system from a process diagram displayed to the user by the graphics editor to enable the user to run configuration set-up and monitoring tasks, wherein the process diagram comprises a two-dimensional diagram area with an imaginary or visualized machine system axis corresponding to a machine component dimension and with an imaginary or visualized process time axis corresponding to a time dimension, wherein all of the partial machine processes involved in the overall machine process are plotted by a fully automated or partially automated positioning of each process symbol, wherein process symbols of partial machine processes that are not needed have been removed again, and wherein every process symbol comprises at least one linking point corresponding to at least one synchronization instant of the partial machine processes displayed in the diagram area and at least one other linking point for defining other synchronization instants of the partial machine processes displayed in the diagram area, wherein the at least one linking point and the at least one other linking point are linked via a synchronization line parallel with the machine system axis to a linking point of a partial machine process of at least one of the same machine unit and another machine unit;

(g) positioning or repositioning each process symbol on the diagram area by the graphics editor so that each process symbol is arranged in the machine component dimension corresponding to the respective machine unit and in the time dimension based on a synchronization of the respective partial machine process with other partial machine processes of the same machine unit or with partial machine processes of other machine units;

(h) displaying a two-value process option for at least one partial machine process by a process symbol with a triangular shape, the triangular shape having peaks, edges, or triangle apexes, wherein one of the peaks, edges, or triangle apexes shows into the direction of the process time axis or against the direction of the process time axis, wherein a machine movement of a machine unit or an opposing movement to the machine movement is selected by orienting the process symbol associated with the machine unit in each of two opposing directions parallel with the process time axis; and (i) creating a pair of process symbols by generating a respective mirror-image process symbol from a mirror image of the process symbol on an axis in mirror image parallel with the machine system axis.

2. The method as claimed in claim 1, wherein the number of partial machine processes includes adjustable process-related waiting times.

3. The method as claimed in claim 2, wherein process-related waiting times are respectively displayed by the process symbol of a filled isosceles triangle, and at least those partial machine processes for which a two-value process option has been defined and the rest of the partial machine processes are displayed by the process symbol of an empty right-angled triangle extending parallel with the process time axis corresponding to the process duration or extending in the direction of the machine system axis so as to correspond to a parameter selected from the group consisting of a traveled distance, a speed, rotation speed or rotation frequency, an acceleration, an angular acceleration, an impulse, a rotary impulse, a force, a pressure, a mass, an electric power, and a noise measurement, and oriented by a triangle apex in the direction of or opposite direction from the process time axis.

4. The method as claimed in claim 1, wherein, during a partially automated configuration of an overall machine process, the user selects a partial machine process from one of optionally several menus or selection fields of the graphics editor which is added to this overall machine process, and this menu or selection field offers a number of partial machine processes for selection, which are available for use by a specific machine unit, and is retrieved on the machine system axis of the process diagram by selecting the symbol for this machine unit, the graphics editor displays all the permissible synchronization lines and linking instants of process symbols of the pre-existing overall machine process for the selected partial machine process in the diagram area to enable the synchronization to be set up, after which the user sets the synchronized timing of the selected partial machine process with the pre-existing overall machine process by selecting a displayed linking instant or a displayed synchronization line or the machine system axis, and the graphics editor then positions the process symbol of the selected partial machine process on the diagram area so that it is arranged in the machine component dimension based on its assignment to a machine unit and in the time dimension based on its synchronization with other partial machine processes of the overall machine process.

5. The method as claimed in claim 4, wherein, when a reversible partial machine processes or a partial machine process with a two-value process option is selected by the user, the graphics editor additionally automatically selects a complementary partial machine process or a supplementary partial machine process to return a relevant machine unit to a defined base position, and displays in the diagram area all the permissible synchronization lines and linking instants of process symbols of the pre-existing overall machine process for the complementary or supplementary partial machine processes in order to set the synchronization and identifies an assignment of every synchronization line and every linking instant to one of the complementary or supplementary partial machine processes so that the complementary or supplementary partial machine processes are synchronized with the pre-existing overall machine process.

6. The method as claimed in claim 4, wherein, when the user has confirmed completion of a manual synchronization of only a partial quantity of all the partial machine processes of an overall machine process, the graphics editor or a subprogram called up by it synchronizes the rest of the selected partial machine processes with the manually synchronized partial machine processes on a fully automated basis and completes the process diagram by plotting the process symbols belonging to these fully automated, synchronized partial machine processes.

7. The method as claimed in claim 4, wherein a graphic presentation is technically explained by synchronization lines or linking instants.

8. The method as claimed claim 1, wherein the graphic process symbols are plotted in the process diagram extending in the direction of the process time axis according to the correct timing of the process duration.

9. The method as claimed in claim 8, wherein at least one graphic process symbol is plotted in the process diagram extending in the direction of the process time axis, every two immediately adjacent graphic linking elements computed as being technically permissible, in other words either linking instants or synchronization lines, are maintained at a predefined minimum distance in the process diagram irrespective of their actual, practically correct diagram set up by the user for selection and at least partially compressed or extending scales of the process time axis are entered in the process diagram for this purpose if necessary.

10. The method as claimed claim 1, wherein the graphic process symbols are plotted in the diagram in a direction of the machine system axis together with generally different parameter settings of a corresponding extension assigned to the individual machine units.

11. The method as claimed in claim 1, wherein at every instant, precisely one associated partial machine process is set up for every machine unit for implementation.

12. The method as claimed in claim 1, wherein the parameters of a partial machine process of a machine unit are set during the course of a partially automated configuration of the overall machine process in such a way that when the user selects the process symbol assigned to this partial machine process already entered in the diagram, an input or selection menu opens, by means of which the user enters parameter values and selects parameter setting options.

13. The method as claimed in claim 1, wherein when a process symbol for a partial machine process set up on the basis of parameters is entered in the diagram area, its parameters are initialized by the editor with defined or computed default values or typical preferred values which are selectively edited by the user by subsequently entering parameters.

14. The method as claimed in claim 1, wherein the graphics editor or a sub-program called up by it monitors the overall machine process for undesired machine cycle delay times and, on detecting such machine cycle delay times, prompts an optimization computation covering the overall machine process or a group of partial machine processes or alternatively only a single partial machine process and provides the user with suggestions for optimizing parameters of specific partial machine processes in at least one of graphic format and tabular format in the process diagram together with a findings report in this connection.

15. The method as claimed in claim 1, wherein parameters of the partial machine processes comprising at least one of metering, injecting, after-pressure, a cooling process, and de-molding within the context of the overall machine process of an injection molding machine include the critical physical variables of at least one of cylinder temperature, screw rotation speed and velocity, dynamic pressure, metering time and screw retraction, injection speed, injection pressure and injection time, after-pressure level and after-pressure time, cooling time and opening force and ejection force.

16. The method as claimed in claim 1, wherein the imaginary or visualized machine system axis and the imaginary or visualized process time axis subtend a right angle.

17. A device for creating, editing, monitoring or optimizing an overall machine process of a programmable machine or system, comprising: means for implementing the method as claimed in claim 1 and means enabling a user to enter configuration data, electronic data processing, output by graphic display and transfer of configuration data to the programmable machine or system when this machine or system is in appropriate operating modes for configuration purposes.

18. The device as claimed in claim 17, wherein the graphics editor comprises an integrated online-graphics editor coupled with a real time processing system of the machine or system controller.

19. The device as claimed in claim 17, wherein it has a touch-sensitive screen.

20. The device as claimed in claim 17, wherein the programmable machine or system is an injection molding machine, the individual machine units of which belong to an injection unit or a closing unit or a machine bed with clamping plates for retaining the mold or belong to the drive and control system, including a control panel.

21. The device as claimed in claim 20, wherein the injection unit comprises a worm screw unit incorporating a hopper and filler neck, wherein the worm screw unit belongs to a cylinder with a screw, heating belts and a nozzle, said injection unit further comprising an applicator unit for moving the entire worm screw unit in the axial direction and a drive for at least one of axial translating movements and rotating movements of the screw.

* * * * *